US009124845B2

(12) United States Patent  (10) Patent No.: US 9,124,845 B2
Pratt et al.  (45) Date of Patent: Sep. 1, 2015

(54) SYSTEM AND METHOD TO CONTROL MEDIA DISPLAY FUNCTIONS

(75) Inventors: James Pratt, Round Rock, TX (US); Marc Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2185 days.

(21) Appl. No.: 11/880,119

(22) Filed: Jul. 19, 2007

(65) Prior Publication Data

US 2009/0021651 A1    Jan. 22, 2009

(51) Int. Cl.
G06F 15/16 (2006.01)
H04N 5/44 (2011.01)
H04N 21/41 (2011.01)
H04N 21/422 (2011.01)
H04N 21/436 (2011.01)
H04N 21/4363 (2011.01)
H04N 21/61 (2011.01)
H04N 21/643 (2011.01)

(52) U.S. Cl.
CPC ......... *H04N 5/4403* (2013.01); *H04N 21/4122* (2013.01); *H04N 21/42204* (2013.01); *H04N 21/4363* (2013.01); *H04N 21/43615* (2013.01); *H04N 21/6125* (2013.01); *H04N 21/6175* (2013.01); *H04N 21/64322* (2013.01); *H04N 2005/4433* (2013.01); *H04N 2005/4442* (2013.01)

(58) Field of Classification Search
USPC ........................................................ 709/232
See application file for complete search history.

(56) References Cited

U.S. PATENT DOCUMENTS

| | | |
|---|---|---|
| 4,785,472 A | 11/1988 | Shapiro |
| 5,808,662 A | 9/1998 | Kinney et al. |
| 5,936,660 A | 8/1999 | Gurantz |
| 6,097,441 A | 8/2000 | Allport |
| 6,588,017 B1 | 7/2003 | Calderone |
| 6,633,281 B2 | 10/2003 | Lin et al. |
| 7,114,172 B2 | 9/2006 | Lord |
| 7,155,305 B2 | 12/2006 | Hayes et al. |
| 7,889,051 B1* | 2/2011 | Billig et al. .................. 340/5.23 |
| 2004/0117849 A1* | 6/2004 | Karaoguz et al. ............. 725/134 |
| 2004/0143847 A1* | 7/2004 | Suzuki et al. ................... 725/61 |
| 2005/0094610 A1* | 5/2005 | de Clerq et al. ............... 370/338 |
| 2005/0148342 A1* | 7/2005 | Sylvain ...................... 455/456.3 |
| 2008/0040758 A1* | 2/2008 | Beetcher et al. ................ 725/81 |
| 2008/0276154 A1* | 11/2008 | Hick et al. .................... 714/799 |

* cited by examiner

*Primary Examiner* — Karen Tang
(74) *Attorney, Agent, or Firm* — Toler Law Group, PC

(57) ABSTRACT

A system and method to control media display functions is disclosed. A system includes a processing logic and memory accessible to the processing logic. The memory includes instructions executable by the processing logic to perform a method including receiving input associated with a media display function. The instructions are also executable by the processing logic to determine one or more media devices to be controlled. The instructions are also executable by the processing logic to send first control data adapted to cause the media display function to be implemented at a first media device when the first media device is to be controlled. The instructions are also executable by the processing logic to send second control data when the first media device and a second media device are to be controlled concurrently. The second control data is adapted to cause the media display function to be implemented at the first media device and at the second media device.

24 Claims, 5 Drawing Sheets

SYSTEM AND METHOD TO CONTROL MEDIA DISPLAY FUNCTIONS

FIELD OF THE DISCLOSURE

The present disclosure is generally related to control of media display functions.

BACKGROUND

Media devices, such as set-top boxes, televisions, personal video recorders, home theater components, and so forth, are used by many households and businesses to provide media content, such as movies, broadcast television, broadcast radio, recorded media content, and so forth. Remote control devices may be used to control such media devices. As media devices become more common, so do the remote control devices that interact with them. Universal remote control devices are available to control some media devices. Universal remote control devices control media devices may be able to control several media devices of different device types to simplify control of media display functions at a particular entertainment center. For example, a user may push a single button at a universal remote control device to turn on both a television and a set-top box device. However, such universal remote control devices are not useful to control media display functions at multiple entertainment centers at the same time, such as to turn on or change channels at two or more televisions in separate rooms. Hence, there is a need for an improved system and method to control media display functions.

DETAILED DESCRIPTION OF THE DRAWINGS

Figure 1:
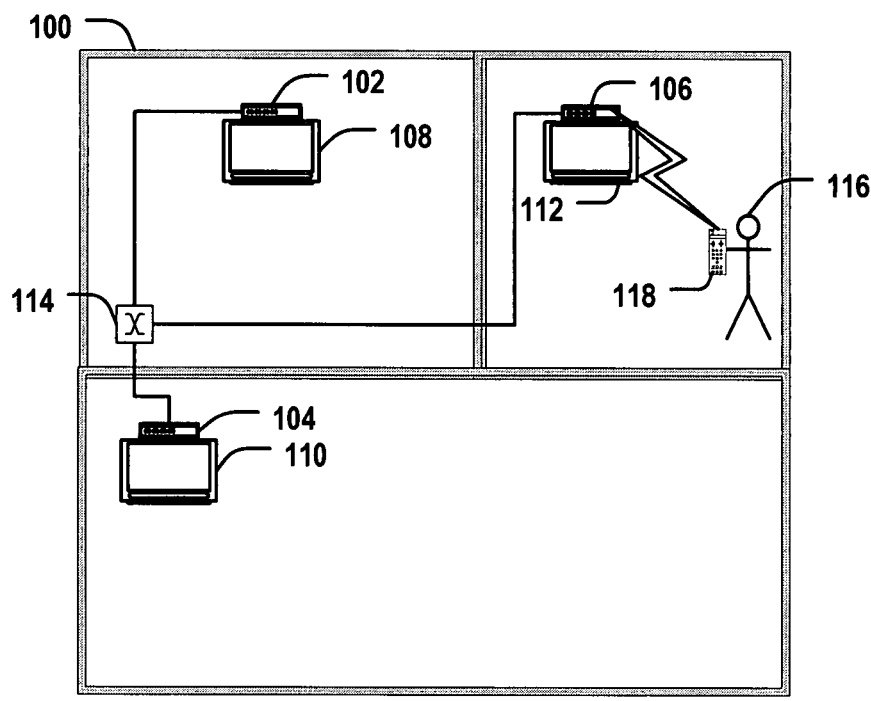
FIG. 1A is a first diagram of a first particular embodiment of a system to control media display functions.
FIG. 1B is a second diagram of a first particular embodiment of a system to control media display functions.
Figure 1:
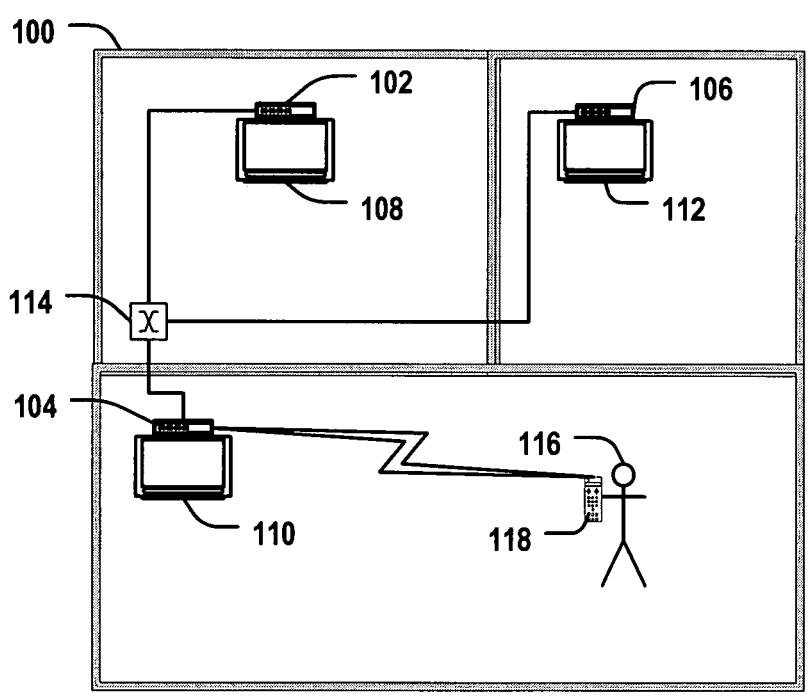

A system to control media display functions is disclosed. In a particular embodiment, the system includes processing logic and memory accessible to the processing logic. The memory includes instructions executable by the processing logic to perform a method including receiving input associated with a media display function. The instructions are also executable by the processing logic to determine one or more media devices to be controlled. The instructions are also executable by the processing logic to send first control data adapted to cause the media display function to be implemented at a first media device when the first media device is to be controlled. The instructions are also executable by the processing logic to send second control data when the first media device and a second media device are to be controlled concurrently. The second control data is adapted to cause the media display function to be implemented at the first media device and at the second media device.

In another particular embodiment, a system to control media display functions is disclosed and includes processing logic and memory accessible to the processing logic. The memory includes instructions executable by the processing logic to perform a method including receiving first control data associated with a media display function. The memory includes instructions executable by the processing logic to determine one or more media devices to be controlled based on the first control data. The memory also includes instructions executable by the processing logic to implement the media display function at a first media device when the first media device is to be controlled. The memory includes instructions executable by the processing logic to implement the media display function at the first media device and sending second control data to a second media device when the first media device and the second media device are to be controlled concurrently. The second control data is adapted to cause the media display function to be implemented at the second media device.

In a particular embodiment, a method of controlling media display functions is disclosed and includes receiving input associated with a media display function. The method includes determining one or more media devices to be controlled. The method also includes sending first control data adapted to cause the media display function to be implemented at a first media device when the first media device is to be controlled. The method further includes sending second control data when the first media device and a second media device are to be controlled concurrently. The second control data is adapted to cause the media display function to be implemented at the first media device and at the second media device.

In another particular embodiment, a computer-readable medium is disclosed and includes processor-executable instructions to receive first control data associated with a media display function. The computer-readable medium also includes processor-executable instructions to determine one or more media devices to be controlled based on the first control data. The computer-readable medium includes processor-executable instructions to implement the media display function at a first media device when the first media device is to be controlled. The computer-readable medium further includes processor-executable instructions to implement the media display function at the first media device and send second control data to a second media device when the first media device and the second media device are to be controlled concurrently. The second control data is adapted to cause the media display function to be implemented at the second media device.

FIGS. 1A and 1B depict a first embodiment of a system to control media display functions. The system includes a plurality of media devices, including set-top box devices 102, 104, 106, residential gateway device 114, and display devices 108, 110, 112. The system may include other or additional media display devices, such as personal video recorders, home theater components, other media communication, tuning or playback devices, or any combination thereof. In a particular embodiment, the media devices may be located relatively near one another, such as within a single premises (e.g., at a subscriber residence 100, or within another building). In another particular embodiment, the media devices may be relatively remote from one another, such as at two or more subscriber residences (not shown), one or more other remote locations, or any combination thereof.

A user 116 can interact with the media devices using a remote control device 118. The remote control device 118 can be adapted to send control data to one or more of the media devices to control various media display functions. For example, the media display functions may include channel change functions, volume control functions, time shifting or "trick play" functions (e.g., pause, rewind, fast forward, stop, play, record, and so forth), any other function associated with the media device being controlled, the media, the media source, or any combination thereof. The remote control device 118 may send the control data using radio frequency data transmissions, infrared data transmissions, other wireless data transmissions, or any combination thereof.

In a particular embodiment, the remote control device 118 may be adapted to control a plurality of the media devices individually or substantially simultaneously. In an illustrative embodiment, the remote control device 118 may include a media device selector adapted to receive input indicating which of the one or more media devices is to be controlled. The media device selector may include one or more user selectable element, such as a switch, button, touch sensitive screen, any other user selectable element, or any combination thereof. In an illustrative embodiment, the media device selector may be used to indicate whether one of the media control devices is to be controlled, or whether a group of the media control devices is to be controlled. To illustrate, by placing the media device selector in a first position, the subscriber 116 may be able to control only a first media device, such as set-top box device 106, using the remote control device 118. By placing the media device selector in a second position, the subscriber 116 may be able to control a plurality of the media devices simultaneously, such as set-top box devices 102, 104, and 106, substantially simultaneously using the remote control device 118.

In a particular embodiment, when the remote control device 118 is set to control a plurality of the media devices, such as set-top box devices 102, 104, and 106, the remote control device 118 may transmit a signal including control data and address data indicating that the control data is intended for each of the media devices 102, 104 and 106. As illustrated in FIG. 1A, the set-top box device 106 may receive control codes from the remote control device 118 and may implement the media display function associated with control codes at the display device 112. In a particular illustrative embodiment, the set-top box device 106 may determine whether the control data is also intended to control the set-top box devices 102 and 104. If the control data is intended to control the set-top box devices 102 and 104, the set-top box device 106 may send control data to the set-top box devices 102 and 104 to implement the media display function. For example, the set-top box devices 102, 104 and 106 may each be linked to the residential gateway device 114. Control data sent from one of the set-top box devices, such as set-top box device 106, may be sent to one or more of the other set-top box devices, such as set-top box device 102 or set-top box device 104 via the residential gateway device 114.

In a particular embodiment, the particular media device that sends control data to the other media devices after receiving control data from the remote control device 118 depends on which media device receives the control data directly from the remote control device 118. For example, as illustrated in FIG. 1A, the user 116 is in a room with the first set-top box device 106. Thus, the first set-top box device 106 may receive the wireless transmission directly from the remote control device 118. However, referring to FIG. 1B, the user 116 has changed locations and is in another room with the second set-top box 104. When the user 116 selects input associated with a media display function at the remote control device 118, the second set-top box device 104 receives the control data directly from the remote control device 118. If the control data indicates that more than one media device is to implement the media display function, the second set-top box device 104 transmits second control data to the one or more other media devices to be controlled, such as a third set-top box device 102, the first top box device 106, or a combination thereof.

Figure 2:
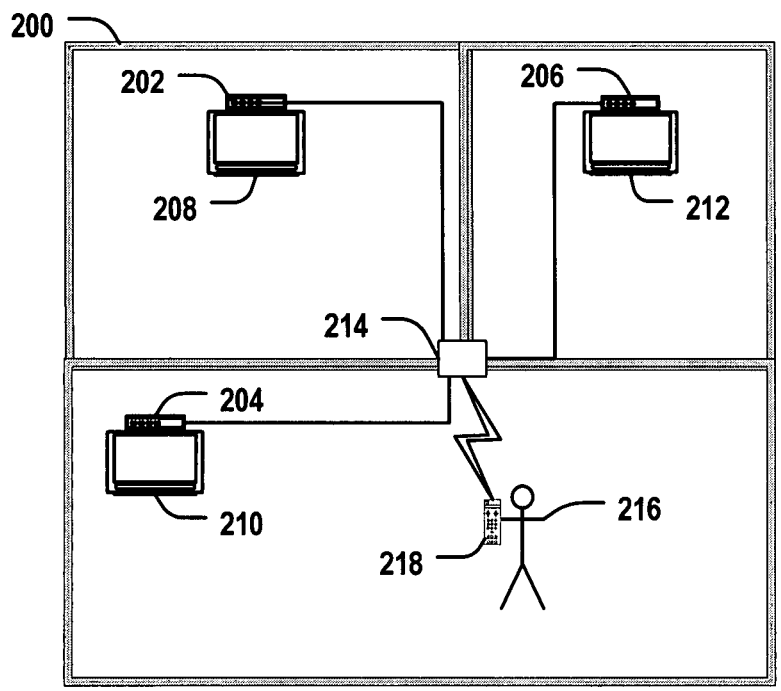
FIG. 2 is a diagram of a second particular embodiment of a system to control media display functions.

Referring to FIG. 2, a second embodiment of a system to control media display functions is illustrated. The system includes a plurality of media devices, such as set-top box devices 202, 204, 206; display devices 208, 210, 212; and a media controller 214. In a particular embodiment, the media controller 214 may be a residential gateway device. In a particular embodiment, the media controller 214 may be another media device, such as a home theatre control device. The plurality of media devices may be co-located, for example, at a subscriber residence 200, or they may be remote from one another.

In a particular embodiment, the media controller 214 is adapted to receive control data from a remote control device 218 and to transmit control data to one or more of the other media devices. To illustrate, the remote control device 218 may be adapted to transmit control codes and address data indicating which of the one or more media devices are to be controlled. The control data may be associated with a media display function such as, a channel change function, volume control function, a trick play function, any other media display function or any combination thereof. The media controller 214 receives the control codes and address data, and determines which media device or media devices to control. The media controller 214 sends control data to the media device(s) to be controlled via a local area network, such as a wired or wireless network.

In a particular embodiment, the remote control device 218 may include a media device selector to indicate which of the one or more media devices is to be controlled. For example, the remote control device 218 may include a switch, slide, toggle, button, touch screen or any other user selectable element, or any combination thereof adapted to receive input from a user 216 indicating which of the one or more media devices is to be controlled. Based on input received via the media device selector, the remote control device 218 may transmit control codes and address data indicating the media device(s) to be controlled and a media display function to be implemented. The input received via the media device selector may indicate that only a first media device, such as set-top box device 204, is to be controlled. Alternatively, the input received via the media device selector may indicate that all of the media devices in a particular group are to be controlled, such as set-top box devices 202, 204 and 206. For example, in a first position, the media device selector may indicate that a media device in the same room with the user 216 is to be controlled (e.g., a media device that receives control data directly from the remote control device 218). In a second position, the media device selector may indicate that all of a group of media devices are to be controlled substantially simultaneously. The group of media devices may include all of the media devices of a particular type. For example, the group of media devices may include two or more of the set-top box devices 202, 204, 206. In another example, the group of media devices may include two or more of the display devices 208, 210, 212.

The media control device 214 may be adapted to determine a location of the remote control device 218. For example, the media control device 214 may include or be associated with a plurality of remote control sensors or receivers. The media control device 218 may determine the remote control sensor or receiver that received control data from the remote control device 218. Thus, based on the location of the remote control sensor that received the control data, the media controller 214 may determine which media device is to be controlled. The media controller 214 sends control data to one or more media devices to implement the media display function based on the media device selector, and, in some instances, based on the location of the remote control device 218.

When the media device selector at the remote control device 218 is set to control only a first media device, the media controller 214 may identify the first media device based on pre-defined settings, the location of their remote control device 218, or both. For example, as illustrated in FIG. 2, the user 216 is in the same room with a first set-top box device 204. When the user 216 provides input associated with a media display function, such as a mute sound function, the remote control device 218 may transmit control data indicating the media display function to be implemented. The remote control device 218 may also transmit address data indicating that only the first set-top box device 204 is to be controlled. In a particular embodiment, the address data may indicate that only the first media device 204 is to be controlled based on a single bit of the address data. For example, a zero at that bit may indicate that only a first media device is to be controlled, and a one at that bit may indicate that a group of media devices are to be controlled. The bit may be set based on input received via the media device selector. When the input received via that media device selector indicates that only the first set-top box device 204 is to be controlled, the media controller 214 may receive the control data and address data from the remote control device 218 and may send second control data to the first set-top box device 204 to implement the media display function at the first set-top box device 204 and correspondingly at the display device 210.

When the input received via the media device selector indicates that all of a group of media devices are to be controlled substantially simultaneously or concurrently, the user 216 may select an input associated with a particular media display function, for example, a pause function. The remote control device 218 may determine which of the media devices are to be controlled, e.g., the set-top box devices 202, 204 and 206, and may transmit control codes and address data indicating the media display function to be performed and the devices to be controlled. The media controller 214 may receive the control data from the remote control device 218 and may send second control data to the devices to be controlled, e.g., the display devices 208. 210, 212 indicating the media display function to be performed. The media devices to be controlled may implement the media display function concurrently or substantially simultaneously. Thus, for example, the user 216 is able to pause display of media at each of the display devices substantially simultaneously.

Figure 3:
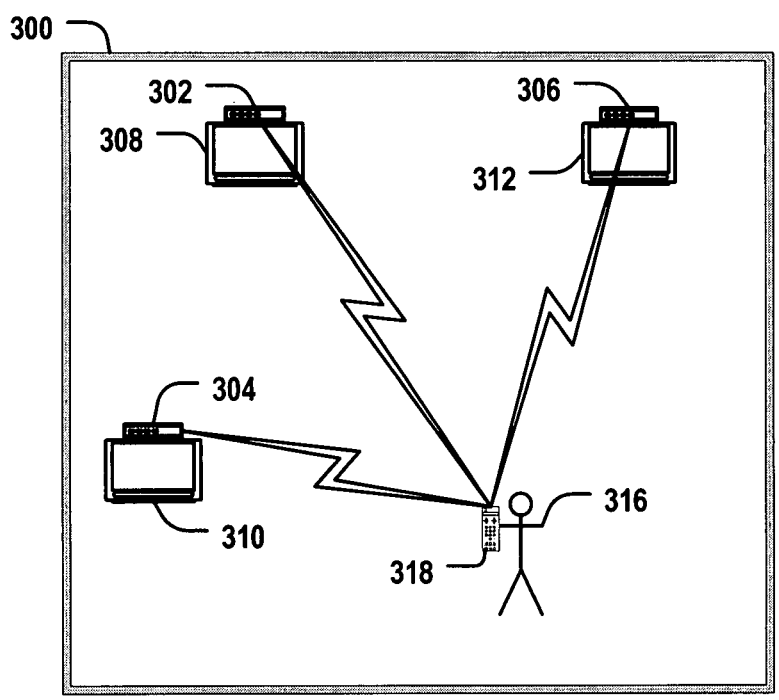
FIG. 3 is a diagram of a third particular embodiment of a system to control media display functions.

Referring to FIG. 3, a third embodiment of a system to control media display functions is illustrated. The system includes a plurality of media devices, such as set-top box devices 302, 304, and 306, and display devices 308, 310, and 312. The system also includes a remote control device 318 adapted to control one or more of the media devices. In a particular embodiment, the remote control device 318 may be adapted to control each media device in a particular group of media devices. For example, the media devices in a particular group may be the same type of device, such as set-top box devices or display devices. In another embodiment, the group of media devices may include dissimilar types of media devices, such as one or more set-top box devices and one or more display devices.

To illustrate, a subscriber may indicate, via the media device selector, that only the first set-top box device 306, is to be controlled. The subscriber 316 can select a media control function input key, such as a channel change key, at the remote control device 318. The remote control device 318 determines which of the one or more media devices are to be controlled and selects control codes and address data associated with the media device to be controlled, in this case, set-top box device 306. The first set-top box device 306 may modify display of media content at the display device 312 based on the received control codes and address data.

To further illustrate, the subscriber 316 may indicate, via the media device selector, that a group of the media devices, including the set-top box devices 302, 304 and 306, are to be controlled. The subscriber 316 can select a media control function input key, such as a channel change key, at the remote control device 318. The remote control device 318 determines which of the media devices are to be controlled and selects control codes and address data associated with the group of media devices to be controlled, in this case, set-top box devices 302, 304 and 306. In a particular embodiment, the control codes are sent substantially simultaneously or concurrently and the address data is selected such that the media devices recognize the control data as intended for them. The set-top box devices 302, 304 and 306 may modify display of media content at the display devices 308, 310 and 312 based on the received control codes and address data. In a particular embodiment, the display of media content at display devices 308, 310, and 312 may be modified substantially simultaneously. In an illustrative embodiment, each media device may respond to at least two addresses, a first address that is unique to the media device and a second address that is associated with a group of media devices to be controlled together. The remote control device 318 may transmit an address bit associated with the group of media devices to control each media device of the group substantially simultaneously.

Figure 4:
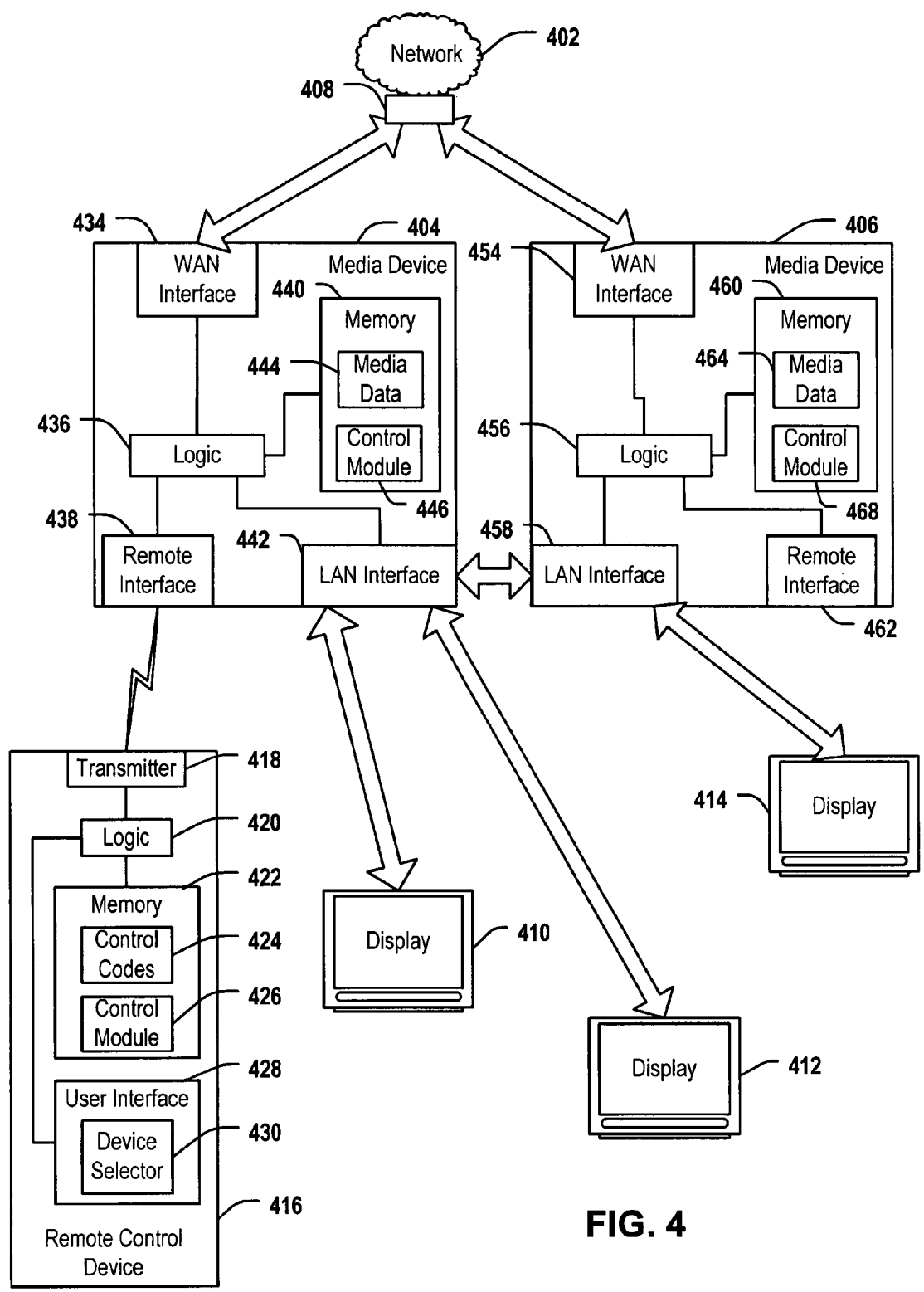
FIG. 4 is a block diagram of a fourth particular embodiment of a system to control media display functions.

Referring to FIG. 4, a fourth particular embodiment of a system to control media display functions is depicted. The system includes a network 402, such as an Internet Protocol Television (IPTV) network, communicating media data to one or more media devices 404, 406. As illustrated in FIG. 4, the media devices 404, 406 may include set-top box devices, residential gateways and so forth. In another particular embodiment, the media devices may include display devices, such as the display devices 410, 412, and 414. The network 402 may communicate with the media devices 404, 406 via an interface device 408. The interface device 408 may include an edge network device such as a digital subscriber line modem (DSLAM), a residential gateway, or any other device adapted to communicate data from the network 402 to the media devices 404, 406. In a particular embodiment, the interface device 408 may be associated with a particular subscriber or residence. In another particular embodiment, the interface device 408 may be associated with a plurality of media devices, such as set-top box devices.

The system also includes a remote control device 416. The remote control device 416 is adapted to communicate with one or more of the media devices 404, 406. The remote control device 416 is adapted to receive input from a user via a user interface 428. The user interface 428 may include user selectable elements, such as buttons, a touch sensitive screen, a voice interface, any other user interface device, or any combination thereof. In a particular embodiment, the user interface 428 includes a device selector 430. The device selector 430 may be adapted to receive user input indicating one or more media devices to be controlled.

The remote control device 416 may include logic 420. The logic 420 may be adapted to determine that one or more media devices to be controlled based on input received via the device selector 430. The logic 420 may be adapted to implement a control module 426 to determine control codes 424 associated with user input received via the user interface 428. In a particular embodiment, the control codes 424 and the control module 426 may be stored in a memory 422 accessible to the logic 420. In a particular embodiment, when the control module 426 has selected control codes 424 from the memory 422, the logic 420 may associate address data based on user input received via the device selector 420 and transmit the control codes and address data via a transmitter 418 to one or more of the media devices 404, 406.

The first media device 404 may include a wide area network (WAN) interface 434, a local area network (LAN) interface 442 and a remote interface 438. The first media device 404 may also include logic 436 and a memory 440 accessible to the logic 436. The memory 440 may include a control module 446 executable by the logic 436 to control the first media device 404. The control module 446 may also be executable by the logic 436 to send control data to the second media device 406.

In a particular embodiment, the second media device 406 may include a wide area network (WAN) interface 454, a local area network (LAN) interface 458 and a remote interface 462. The second media device 406 may also include logic 456 and a memory 460 accessible to the logic 456. The memory 460 may include a control module 468 executable by the logic 456 to control the second media device 406. The control module 468 may also be executable by the logic 456 to send control data to the first media device 404.

In a particular embodiment, when the first media device 404 receives control data via the remote interface 438, the logic 436 may implement the control module 446 to determine whether the control data is addressed to the first media device 404. If the control data is addressed to the first media device 404, the control module 446 may also determine whether the control data is intended for one or more other media devices, such as the second media device 406. The control module 446 may determine a media display function to be implemented based on the control data. The logic 436 may implement the media display function at the first media device 404. For example, one or more display devices such as, a first display device 410 and a second display device 412 may be coupled to the first media device 404. The control module 446 may determine at which of the display devices 410, 412 the media display function is to be implemented. The logic 436 may implement the media display function at the appropriate one or more display devices 410, 412. In a particular embodiment, when the control data indicates that the second media device 406 is also to be controlled, the logic 436 sends second control data to the second media device 406 via the LAN interface 442 of the first media device 404 and the LAN interface 458 of the second media device 406.

In a, non-limiting, illustrative embodiment, the second media device 406 may be a slave device to the first media device 404. In this embodiment, the second media device 406 may not include the remote interface 462. Rather, control data for the second media device 406 may be routed via the first media device 404. In a second illustrative, non-limiting, embodiment, the second media device 406 may not include the wide area network interface 454. Rather, media data may be routed to the second media device 406 via the first media device 404.

In a particular embodiment, when control data is received at the second media device 406 from the first media device 404, the second media device 406 determines whether the control data is addressed to the second media device, and the media display function to be implemented. In the particular embodiment illustrated in FIG. 4, a third display device 414 is associated with the second media device 406. If the control data is addressed to the second media device 406, the second media device implements the media display function at the second media device 406. For example, the second media device 406 may modify a display at the third display device 414.

In a particular embodiment, each of the media devices 404, 406 may include an independent interface to media data. For example, each of the media devices may include a WAN interface 434, 454 coupled to a network 402. The network 402 may send media data to each of the media devices via the media device's independent WAN interface 434, 454. In a particular embodiment, the media content may include media data 444, 464 stored in the memory 440, 460. For example, the first media device 404 may include a personal video recorder, such as a digital video recorder that records received media data to an internal memory, such as a hard drive. In a particular embodiment, the second media device 406 may include a personal video recorder such as a digital video recorder that stores received media data 464 in the memory 460.

To illustrate, the first media data 444 at the first media device 404 may include first media content. The second media data 464 at the second media device 406 may also include the first media content. A user may indicate, via the device selector 430, that both the first and the second media devices 404, 406 are to be controlled. The user may also select a media display function, such as a play function to play the first media content from the media data 444, 464. Both the first media device 404 and the second media device 406 may implement the media display function substantially simultaneously. Thus, the first display device 410, the second display device 412, and the third display device 414 may each display the media content substantially simultaneously. The first media content may be substantially synchronized between the three display devices 410, 412, 414. Similarly, if the user provides input associated with a pause function, the first media content displayed at the three display devices 410, 412, 414 may be paused substantially simultaneously.

Figure 5:
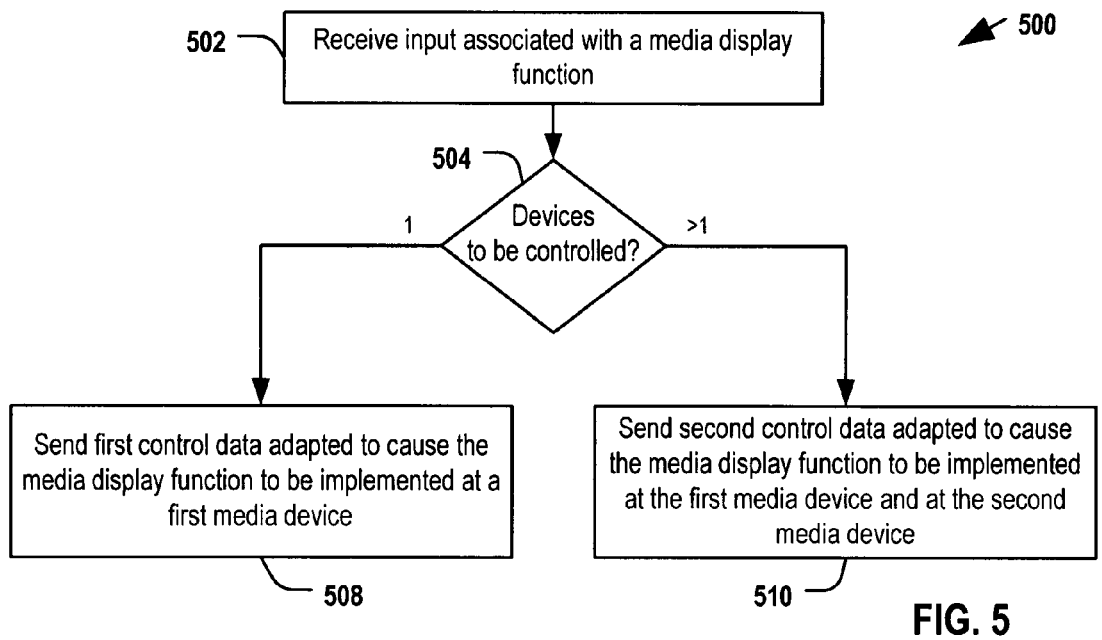
FIG. 5 is a flow chart of a first particular embodiment of a method of controlling media display functions.

FIG. 5 depicts a first particular embodiment of a method of controlling media display functions, generally designated 500. The method 500 includes at 502 receiving input associated with a media display function. For example, the input may be received via a user interface at a remote control device. In another example, the input may be received at a residential gateway, or media controller associated with the one or more media devices.

The method 500 also includes determining which devices are to be controlled, at 504. If only one device is to be controlled, the method may include, at 508, sending first control data to a first media device. The first control data may be adapted to cause the media display function to be implemented at the first media device. The first media device may be a media device that receives the input, a media device pre-defined as the first media device, or a media device selected based on the location of the remote control device. For example, when the input is received at a media controller or a residential gateway, the first media device may be selected based on that location of the remote control device.

Returning to 504, if more than one media device is to be controlled, the method 500 may include, at 510, sending second control data. The second control data may be adapted to cause the media display function to be implemented at the first media device and at a second media device. In a particular embodiment, the second control data may be adapted to cause the media display function to be implement substantially simultaneously at the first media device and the second media device.

Figure 6:
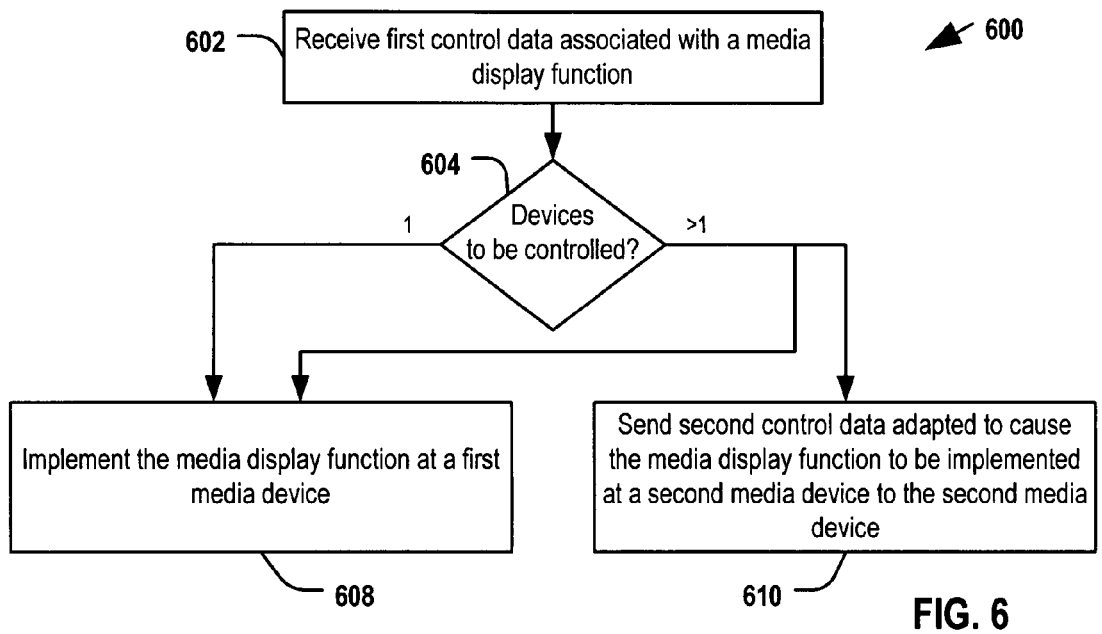
FIG. 6 is a flow chart of a second particular embodiment of a method of controlling media display functions.

FIG. 6 depicts a second particular embodiment of a method of controlling media display functions, generally designated 600. The method 600 includes, at 602, receiving first control data associated with a media display function. The method 600 also includes, at 604, determining which media device or media devices are to be controlled.

In a particular embodiment, when a first media device is to be controlled, the method 600 includes, at 608, implementing the media display function at the first media device. The first media device may be selected based on which media device received the first control data, address data associated with the first control data, a location of a remote control device that sent the first control data, a pre-defined list, or any combination thereof.

Returning to 604, if more than one media device is to be controlled, the method 600 may include, at 610, sending second control data adapted to cause the media display function to be implemented at a second media device. When more than one device is to be controlled, the method 600 may also include, at 608, implementing the media display function at the first media device. In a particular embodiment, the second control data may be adapted to cause the media display function to be implemented at the second control device substantially simultaneously with or concurrent to the implementation of the media display function at the first media device.

Figure 7:
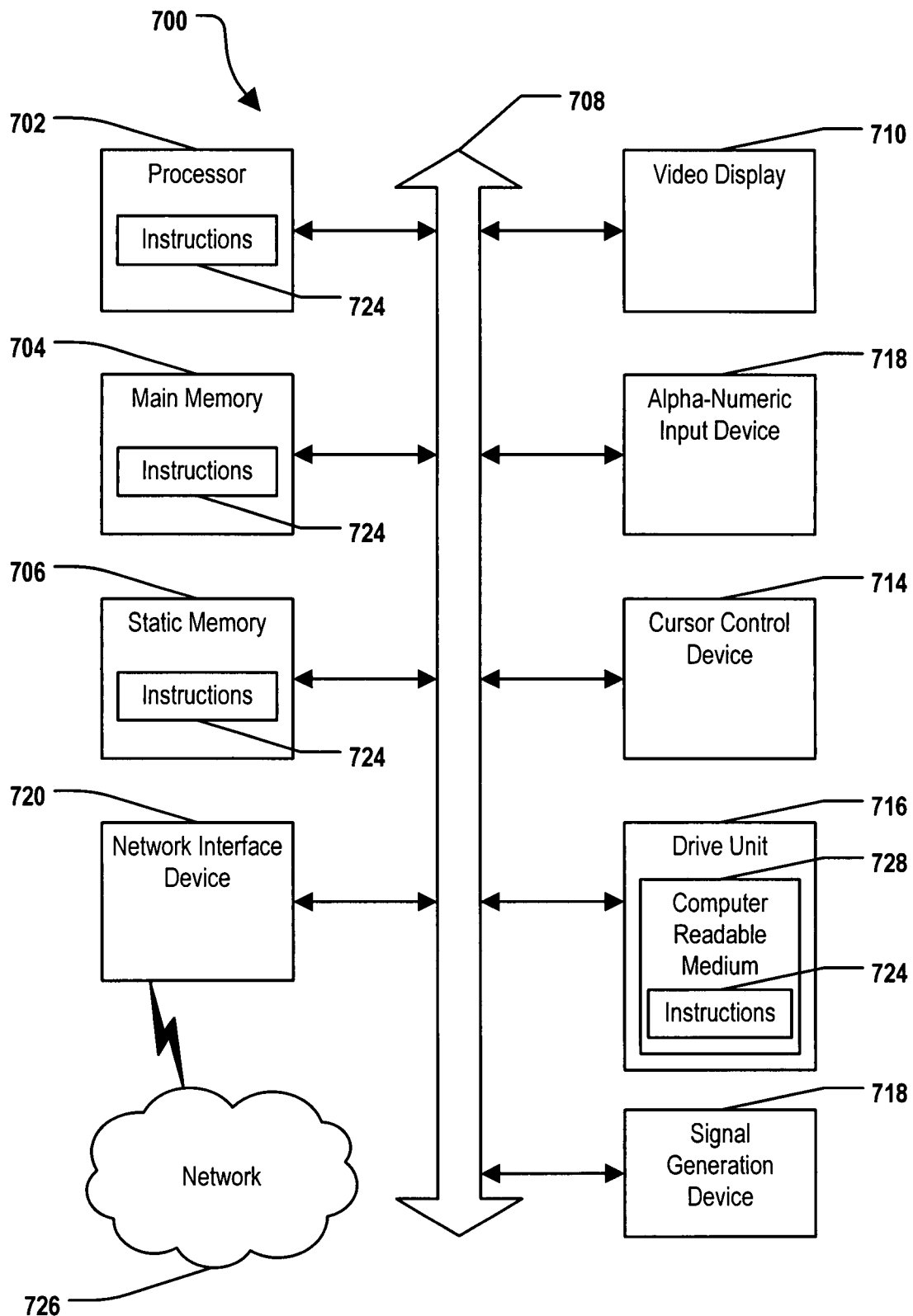
FIG. 7 is a block diagram of an illustrative embodiment of a computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices. For example, the computer system 700 may include or be included in one or more of the media devices, or remote control devices depicted in FIGS. 1A-4.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706, that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   processing logic; and
   memory accessible to the processing logic, wherein the memory includes instructions executable by the processing logic to:
   receive a signal from a remote control device, wherein the signal includes address data and a media display function, and wherein the media display function includes one of a channel change feature, a volume control feature, a play feature, a rewind feature, a pause feature, a fast-forward feature, a stop feature, and a record feature;
   determine whether to control a media device of a network or a plurality of media devices of the network based on the address data, wherein the address data includes an address bit that indicates to control the media device when the address bit is a first value and that indicates to control the plurality of media devices when the address bit is a second value different from the first value;
   based on a determination to control the media device:
      determine a location of the remote control device;
      determine a particular media device to be controlled based on the location of the remote control device; and
      send first control data to the particular media device via the network to implement the media display function; and
   based on a determination to control the plurality of media devices, send second control data to the plurality of media devices via the network to enable each media device of the plurality of media devices to implement the media display function.

2. The system of claim 1, wherein the signal is received at a media control device.

3. The system of claim 1, wherein the address data is determined by a position of a selectable switch at the remote control device.

4. The system of claim 1, wherein the signal is received at a residential gateway device.

5. The system of claim 1, wherein the signal is received by a home theatre control device.

6. The system of claim 1, wherein the first control data comprises address data associated with the particular media device.

7. The system of claim 1, wherein the plurality of media devices includes set-top box devices, display devices, or a combination thereof.

8. The system of claim 1, wherein the particular media device comprises a set-to box device or a display device.

9. The system of claim 1, wherein a first media device of the plurality of media devices includes a first media access interface to access media content, wherein a second media device of the plurality of media devices includes a second media access interface to access the media content, and wherein the first media access interface and the second media access interface are independent.

10. The system of claim 9, wherein the first media device performs the media display function via the first media access interface, and wherein the second media device implements the media display function via the second media access interface.

11. The system of claim 10, wherein the first media access interface includes a first memory at the first media device, and wherein the second media access interface includes a second memory at the second media device.

12. The system of claim 10, wherein the first media access interface includes a first network interface at the first media device, and wherein the second media access interface includes a second network interface at the second media device.

13. A media device comprising:
a processor; and
memory accessible to the processor, wherein the memory includes instructions executable by the processor to perform operations including:
receiving a signal from a remote control device, wherein the signal includes address data and a media display function, and wherein the media display function includes one of a channel change feature, a volume control feature, a play feature, a rewind feature, a pause feature, a fast-forward feature, a stop feature, and a record feature;
making a determination, based on the address data, whether the media device is to implement the media display function or whether the media device and a second media device are to implement the media display function, the second media device coupled to the media device by a network, wherein the address data includes an address bit that indicates to implement the media display function via the media device when the address bit is a first value and that indicates to implement the media display function via the media device and the second media device when the address bit is a second value different from the first value;
when the determination indicates to implement the media display function via the media device, implementing the media display function; and
when the determination indicates to implement the media display function via the media device and the second media device:
implement the media display function; and
sending second control data to the second media devices via the network to enable implementation of the media display function via the second media device.

14. The media device of claim 13, wherein the second media device is coupled to the media device via a local area network connection.

15. The media device of claim 13, wherein the media device comprises a master device and wherein the second media device comprises a slave device.

16. The media device of claim 13, wherein the second control data is sent to the second media device via a network connection.

17. The media device of claim 13, wherein the media device and the second media device are of a same device type.

18. A method, comprising:
receiving a signal from a remote control device at a media device, wherein the signal includes address data and a media display function, and wherein the media display function includes one of a channel change feature, a volume control feature, a play feature, a rewind feature, a pause feature, a fast-forward feature, a stop feature, and a record feature;
determining, at the media device based on the address data, whether the signal is directed to the media device or to a plurality of media devices, wherein the address data includes an address bit that the signal is directed to the media device when the address bit is a first value and that indicates that the signal is directed to the plurality of media devices when the address bit is a second value different from the first value;
based on a determination that the signal is directed to the media device, performing the media display function via the media device; and
based on a determination that the signal is directed to the plurality of media devices:
performing the media display function via the media device; and
sending second control data to a second media device from the media device, wherein the second control data causes the media display function to be implemented by the second media device.

19. The method of claim 18, wherein the media device and the second media device are located in separate rooms.

20. The method of claim 18, wherein the address data is determined by user input received at a selectable element of the remote control device, and wherein the selectable element comprises a touch screen, a switch, a button, or a combination thereof.

21. The method of claim 20, wherein sending the second control data comprises sending the second control data to a media controller.

22. A computer-readable memory device comprising instructions executable by a processor to perform operations including:
receiving a signal from a remote control device, wherein the signal includes address data and a media display function, and wherein the media display function includes one of a channel change feature, a volume control feature, a play feature, a rewind feature, a pause feature, a fast-forward feature, a stop feature, and a record feature;
determining whether to control a media device of a network or media devices of the network based on the address data, wherein the address data includes an address bit that indicates to control the media device when the address bit is a first value and that indicates to control the media devices when the address bit is a second value different from the first value;
based on a determination to control the media device:
determining a location of the remote control device;
determining a particular media device to be controlled based on the location of the remote control device; and
sending first control data to the particular media device via the network to implement the media display function; and
based on a determination to control the media devices, sending second control data to the media devices via the network to enable each media device of the media devices to implement the media display function.

23. The computer-readable memory device of claim 22, wherein the processor is a component of a residential gateway device.

24. The computer-readable memory device of claim 22, wherein the location of the remote control device is determined based on input received from a remote control sensor.

* * * * *